(12) United States Patent
Hillmann et al.

(10) Patent No.: US 11,077,820 B2
(45) Date of Patent: Aug. 3, 2021

(54) PROPELLANT CAGE FOR AN INFLATOR, INFLATOR COMPRISING SUCH PROPELLANT CAGE OPERATING METHOD AND METHOD OF GUIDING A SHOCK WAVE OF AN INFLATOR

(71) Applicant: TRW Airbag Systems GmbH, Aschau a. Inn (DE)

(72) Inventors: Daniel Hillmann, Gars Bahnhof (DE); Christian Jung, Mühldorf am Inn (DE); Lorenz Seidl, Reitmehring (DE); Georg Tautschnig, Vilsbiburg (DE); Wolfgang Tengler, Marquartstein (DE)

(73) Assignee: TRW AIRBAG SYSTEMS GMBH, Aschau am Inn (DE)

( * ) Notice: Subject to any disclaimer, the term of this patent is extended or adjusted under 35 U.S.C. 154(b) by 93 days.

(21) Appl. No.: 16/409,971

(22) Filed: May 13, 2019

(65) Prior Publication Data
US 2019/0351864 A1 Nov. 21, 2019

(30) Foreign Application Priority Data
May 18, 2018 (DE) .................... 10 2018 112 010.9

(51) Int. Cl.
*B60R 21/264* (2006.01)
*B60R 21/272* (2006.01)
*B60R 21/274* (2011.01)

(52) U.S. Cl.
CPC .......... *B60R 21/272* (2013.01); *B60R 21/274* (2013.01)

(58) Field of Classification Search
CPC ............... B60R 21/263; B60R 21/264; B60R 2021/2648; B60R 2021/2633

USPC ................................. 280/736, 737, 741, 742
See application file for complete search history.

(56) References Cited

U.S. PATENT DOCUMENTS

| | | | |
|---|---|---|---|
| 5,584,506 A * | 12/1996 | Van Wynsberghe | B60R 21/261 280/736 |
| 8,011,302 B2 * | 9/2011 | Abaziou | B60R 21/2644 102/530 |
| 10,179,317 B2 | 1/2019 | Noda et al. | |
| 2003/0025313 A1 * | 2/2003 | Sawa | B60R 21/2644 280/741 |
| 2003/0071447 A1 * | 4/2003 | Ogawa | B60R 21/272 280/741 |
| 2004/0100079 A1 * | 5/2004 | Yamazaki | B60R 21/261 280/741 |
| 2005/0056182 A1 | 3/2005 | Englbrecht et al. | |

(Continued)

FOREIGN PATENT DOCUMENTS

| | | |
|---|---|---|
| CN | 203391727 | 1/2014 |
| DE | 10358057 | 7/2007 |
| GB | 2361217 | 4/2000 |

*Primary Examiner* — Toan C To
(74) *Attorney, Agent, or Firm* — Tarolli, Sundheim, Covell & Tummino LLP (57) ABSTRACT

The invention relates to a propellant cage (10) for an inflator, especially for a tubular inflator of an airbag module, comprising a substantially tubular base (11) which forms, on the one hand, a gas inlet opening (12a) and, on the other hand, a gas outlet opening (12b) along its longitudinal axis (L), wherein at least one lateral gas flow opening (13) is configured in a circumferential wall (12) of the base (11), wherein the base (11) includes a radially outwardly extending collar (11c) having at least one frontal gas flow opening (14) in the area of the gas flow opening (12c).

18 Claims, 5 Drawing Sheets

(56) References Cited

U.S. PATENT DOCUMENTS

| | | | |
|---|---|---|---|
| 2005/0161923 A1* | 7/2005 | Hirooka | B60R 21/2644 280/741 |
| 2006/0249938 A1* | 11/2006 | Matsuda | B60R 21/261 280/736 |
| 2008/0054610 A1 | 3/2008 | Heigl et al. | |
| 2008/0284146 A1* | 11/2008 | Hirooka | B60R 21/2644 280/736 |
| 2011/0018243 A1 | 1/2011 | Yano et al. | |
| 2011/0221173 A1 | 9/2011 | Cox et al. | |
| 2013/0036934 A1 | 2/2013 | Prima et al. | |
| 2016/0229372 A1* | 8/2016 | Spencer | B60R 21/264 |
| 2020/0139926 A1* | 5/2020 | Bendel | B60R 21/2644 |

* cited by examiner

PROPELLANT CAGE FOR AN INFLATOR, INFLATOR COMPRISING SUCH PROPELLANT CAGE OPERATING METHOD AND METHOD OF GUIDING A SHOCK WAVE OF AN INFLATOR

RELATED APPLICATION

This application claims priority from German Application No. 10 2018 112 010.9, filed May 18, 2018, the subject matter of which is incorporated herein by reference in its entirety.

BACKGROUND OF THE INVENTION

The invention relates to a propellant cage for an inflator in accordance with the preamble of claim 1. Further, the invention relates to an inflator comprising such propellant cage. The invention moreover deals with an airbag module including an inflator of this type. In addition, the invention shows an operating method of an inflator and a method of guiding a shock wave in an inflator.

A propellant cage comprising the features of the preamble of claim 1 is known, for example, from EP 2 471 692 B1.

In general, a propellant cage of an inflator fulfills plural functions. In the mounted state, the propellant cage delimits especially a propellant chamber in which pyrotechnic propellant bodies are positioned. The propellant bodies may comprise for example propellant pellets, as shown in EP 2 471 692 B1. In this respect, the propellant cage serves for positioning the propellant bodies inside the inflator. At the same time, it is the purpose of the propellant cage to enable ignition gas to flow from an igniter unit into the propellant chamber to ignite the propellant as intended by the ignition gases so that the propellant can generate, by specific burn-up, propellant gas which can be provided, for example, for filling an airbag by the inflator. To this end, the known propellant cage, on the one hand, has along its longitudinal axis a gas inlet opening which is arranged at an axial end of its tubular base member facing the igniter unit. Via the gas inlet opening ignition gas ejected from the igniter unit may first flow into the interior of the propellant cage. Furthermore, in the known propellant cage radially arranged through-holes are provided through which part of the inflowing ignition gas can flow to the outside of the propellant cage, concretely speaking into the propellant chamber formed around the propellant cage. In this way, the ignition gas gets into contact with the propellant bodies which are arranged as propellant bed in the propellant chamber. The propellant bodies are ignited by the hot ignition gas and release the propellant gas. In the known propellant cage, via the same gas flow openings through which the ignition gas has entered into the propellant chamber, the propellant gas flows into the interior of the propellant cage again and is then guided out of the propellant cage via a gas outlet opening axially opposed to the gas inlet opening.

It is another function of the propellant cage to forward a shock wave which is generated in the area of the gas inlet opening. The shock wave is formed by excess pressure occurring within an ignition chamber when the igniter unit is ignited. Since the ignition chamber is longitudinally delimited in the axial direction by a bursting diaphragm, after activation of the igniter unit initially pressure is built up inside the ignition chamber. As soon as a predetermined pressure is exceeded, the bursting diaphragm ruptures and the pressurized ignition gas flows into the propellant cage. The sudden rupture of the bursting diaphragm and, resp., a pressure difference between the pressure level built up in the ignition chamber and that of the pressure chamber located downstream of the bursting diaphragm in the direction of flow causes formation of the shock wave which is to be guided through the propellant cage in the direction of the longitudinal axis.

The aforementioned functions are substantially fulfilled by the known propellant cage according to EP 2 471 692 B1. However, it may be a drawback that in such design the radial flow openings of the propellant cage, on the one hand, introduce ignition gas into the propellant chamber and, on the other hand, discharge propellant gas from the propellant chamber. In this way, it is possible, for example, that ignition gas which is continuously upcoming and flowing into the propellant chamber prevents already formed propellant gas from leaving the propellant chamber. In this respect, there may be a time delay in forwarding the propellant gas which may extend the period of time between activation of the inflator and filling of an airbag with propellant gas.

SUMMARY OF THE INVENTION

Against this background, it is an object of the present invention to state a propellant cage for an inflator which allows improved gas conduction, especially ignition gas conduction, so that a time delay in the burn-up of propellant bodies is minimized and, resp., the burn-up of propellant bodies is optimized. Further, it is an object of the invention to state an inflator comprising a propellant cage of this type. Moreover, it is an object of the invention to state an airbag module as well as a vehicle safety system comprising an inflator as well as a method of operating an inflator and of guiding a shock wave within an inflator.

In accordance with the invention, this object is achieved with respect to the propellant cage by the subject matter of claim 1, with respect to the inflator by the subject matter of claim 9, with respect to the airbag module by the subject matter of claim 13, with respect to the vehicle safety system by the subject matter of claim 14 and with respect to the operating method as well as the method of guiding a shock wave within an inflator by the subject matters of the claims 15 and 16.

Thus, the invention is based on the idea to state a propellant cage for an inflator, especially for a tubular inflator of an airbag module, the propellant cage having a substantially tubular base which on the one hand forms a gas inlet opening and, on the other hand, forms a gas outlet opening along its longitudinal axis. In a circumferential wall of the base at least one lateral gas flow opening is formed. Further, the base includes a radially outwardly extending collar having at least one frontal gas flow opening in the area of the gas outlet opening. For the sake of completeness, concerning the term "outwardly" it is noted that the direction pointing away from the longitudinal axis of the base is meant in this context.

The propellant cage according to the invention separates the function of inflow of the ignition gas into a propellant chamber from the function of outflow of the propellant gas out of the propellant chamber. In other words, the propellant cage according to the invention enables simultaneous but locally separated gas inflow and gas outflow with respect to a propellant chamber. The propellant chamber according to the invention also enables the ignition gas to flow into a propellant chamber in a substantially radial direction which is different from, i.e. substantially orthogonal to, an axial outflow direction of propellant gas out of the propellant chamber. As at least one frontal gas flow opening is provided, the propellant cage according to the invention allows to discharge generated propellant gas from a propellant chamber which is delimited by the propellant cage, while ignition gas simultaneously flows into the propellant chamber via the lateral gas flow opening. Consequently, when considered under fluidic aspects, outflow of generated propellant gas from the propellant chamber is not obstructed or restricted by inflow of ignition gas into the propellant chamber. Thus, propellant gas may be released without any significant time delay. The period of time between activation of an inflator which comprises the propellant cage according to the invention and filling of a connected airbag is thus reduced. In accordance with the invention, the term ignition gas also includes hot ignition particles and, resp., hot ignition plume so that it is not restricted to a purely gaseous matter.

The invention is of particular advantage in that the lateral gas flow opening and the frontal gas flow opening are differently oriented: While the lateral gas flow opening is disposed in a circumferential wall of the propellant cage, the frontal gas flow opening is provided in a collar extending radially outwardly from the circumferential wall. Propellant gas generated in a propellant chamber delimited by the propellant cage thus can leave the propellant chamber substantially in an axial direction in parallel to the flow direction of the portion of the ignition gas which flows centrally through the propellant cage and leaves the latter via the gas outlet opening. Said axially parallel direction also generally corresponds to a or the main flow direction of gases and, resp., also to the direction of propagation of a shock wave to be triggered inside an inflator in which the propellant cage according to the invention may be mounted, wherein said direction extends starting from a frontal igniter unit to an axially frontally opposed outlet opening of the inflator for propellant gas. Thus, additional deflection of the generated propellant gas within the inflator can be avoided so that the propellant gas generated in the propellant chamber may flow through the frontal gas flow opening of the collar of the propellant cage according to the invention in an aligned manner unhindered further through the inflator. On the one hand, this results in an acceleration of the process of activating an inflator and, resp., in a reduction of the time for providing propellant gas for filling an airbag. On the other hand, this helps to prevent flow turbulences in areas which otherwise might impair a shock wave released at a bursting diaphragm of an igniter unit.

For the purpose of explanation: a shock wave released especially in a tubular inflator as intended serves for breaking or for opening a further bursting diaphragm disposed at the outlet end of the tubular inflator so that gas provided and/or formed in the tubular inflator may flow into a connected airbag. In so far, it is especially relevant to the functioning of such tubular inflator that a uniform stable shock wave is formed. It is especially required that the stability and homogeneity of the shock wave is retained along its entire travel through the inflator to the further bursting diaphragm. As in the invention the propellant gas generated in a propellant chamber is guided through the frontal gas flow opening extending in parallel to the longitudinal axis of the propellant cage and being located in the collar of the propellant cage, interference or weakening of the shock wave is prevented by the fact that no propellant gas is introduced radially to a guiding passage of the shock wave or radially to a propagation direction of the shock wave.

In a preferred embodiment of the invention, the base of the propellant cage includes a substantially funnel-shaped portion. The funnel-shaped portion widens especially toward the gas outlet opening. The at least one lateral gas flow opening may be arranged in the funnel-shaped portion. As an alternative, the at least one lateral gas flow opening may also be arranged in a hollow-cylindrical portion of the base which comprises the gas inlet opening. It has shown that by the funnel-shaped portion, especially if said portion widens toward the gas outlet opening, especially proper stabilization of a generated shock wave is obtained. The shock wave propagates extremely homogenously in the direction of the longitudinal axis inside the propellant cage, with the funnel-shaped portion causing the shock wave to stabilize. The shock wave widening along the funnel-shaped portion therefore is especially robust. Moreover, it has surprisingly turned out that the stability of the shock wave is maintained even when it has left the propellant cage. Thus, the funnel-shaped portion widening toward the gas outlet opening helps to stabilize a shock wave to such extent that it is especially stable and robust even in the further travel inside an inflator, especially a tubular inflator, until the shock wave impinges on an outlet-side bursting diaphragm of the inflator. This increases the operating safety of such inflator.

The base of the propellant cage equipped with a funnel-shaped portion may in total be substantially trumpet-shaped. Within the scope of the present invention, the term "funnel-shaped" therefore does not necessarily denote a frustum shape having a smooth circumferential surface. Rather, the circumferential wall of the funnel-shaped portion may be curved in the direction of the longitudinal axis. For a stable design of a shock wave it is beneficial at any rate when the funnel-shaped portion, even if the circumferential wall thereof is curved in the direction of the longitudinal axis, widens toward the gas outlet opening of the base. The inside diameter of the base thus increases from the gas inlet opening toward the gas outlet opening. Advantageously, the inside diameter of the base is increased continuously and, resp., stepless at least in the funnel-shaped portion. The radially outwardly extending collar may be directly adjacent to the funnel-shaped portion. The collar portion may be formed especially as an inside-out turned portion of the base. In total, a trumpet shape of the base may be resulting in this way.

In another preferred embodiment of the propellant cage, the at least one lateral gas flow opening is provided to have a circular and/or slotted and/or gill-type design. Alternatively, or additionally, the at least one frontal gas flow opening may have a circular and/or slotted and/or gill-type design. In general, different geometries are possible for the lateral gas flow opening and/or the frontal gas flow opening. Especially, the lateral gas flow openings may extend substantially radially relative to the longitudinal axis of the tubular base. However, it has turned out to be especially advantageous when the lateral gas flow openings are arranged at an angle with the longitudinal axis of the tubular base. Especially gill-type lateral gas flow openings have turned out to be especially advantageous for discharging part of an ignition gas in an area outside the propellant cage. A gill-type lateral gas flow opening especially causes efficient discharge of part of the ignition gas into a propellant bed surrounding the propellant cage. Thus, it is especially advantageous to guide ignition gas which is initially provided inside the propellant cage through the gill-type lateral gas flow opening to an outer environment of the propellant cage, for example a propellant chamber comprising propellant bodies.

The, especially gill-type, at least one lateral gas flow opening is preferably formed by a radially inwardly formed part of the circumferential wall of the base. In other words, part of the circumferential wall of the base may be impressed in the direction of the longitudinal axis of the base so that basically a lateral gas flow opening is resulting which has a substantially axially parallel inlet area relating to the longitudinal axis of the base. Ignition gas flowing through the base may be thus be introduced to the lateral gas flow opening in the direction of the longitudinal axis. The radially inwardly formed part of the circumferential wall thus may form a flow guiding element by which part of an axial ignition gas flow can be outwardly deflected. Such gill-type design of the lateral gas flow opening increases the efficiency of the propellant cage as regards splitting or distribution of ignition gas. On the one hand, part of the ignition gas, preferably a major part of the ignition gas, is guided in the direction of the longitudinal axis through the base of the propellant cage. Another part, preferably a smaller part, of the ignition gas is deflected to the outside through the lateral gas flow opening, however, thus achieving, by the formed part of the circumferential wall, a conduction of gas which entails few turbulences concerning a flow of gas or gases. In this respect, especially the formation of a shock wave and, resp., forwarding or propagation of the same by the gill-type lateral gas flow openings is hardly impaired.

In general, it applies to the propellant cage according to the invention that it may exhibit not only one single lateral gas flow opening and/or one single frontal gas flow opening. Rather, the circumferential wall of the base, especially the funnel-shaped portion and/or the hollow-cylindrical portion, may comprise plural lateral gas flow openings which jointly form a hole pattern. Alternatively, or additionally, also plural frontal gas through-holes may be provided which may be arranged in the circumferential direction of the collar at regular and/or irregular intervals. The use of plural lateral gas flow openings and the selection of an appropriate hole pattern may help to further increase the efficiency of the propellent cage according to the invention. Especially, by plural lateral gas flow openings uniform ignition of the propellant bodies in a propellant bed surrounding the propellant cage may be achieved.

Preferably, the lateral gas flow openings of the hole pattern are geometrically different. Especially, each of the lateral gas flow openings of the hole pattern may be circular and/or slotted and/or gill-type. The geometry and the position of individual lateral gas flow openings influences the ignition and burning behavior of propellant bodies arranged around the propellant cage. In this respect, different hole patterns may be used for the respective desired ignition or burn-up characteristic of propellant bodies. The hole patterns may include lateral gas flow openings of different geometries, wherein circular, slotted and/or gill-type geometries can be freely combined with each other.

The lateral gas flow openings of the hole pattern may be arranged to be regularly or irregularly distributed in the circumferential direction and/or in the longitudinal direction. Since the position of the lateral gas flow openings influences the ignition and burn-up behavior of propellant bodies outside the propellant cage, those skilled in the art will select the respective preferred positions of the lateral gas flow openings corresponding to requirements.

The foregoing is substantially applicable analogously to the frontal gas flow openings. The frontal gas flow openings of the collar may equally exhibit different geometries, wherein frontal gas flow openings having different geometries may be combined with each other. The frontal gas flow openings may equally be arranged to be irregularly and/or regularly distributed in the collar.

In a preferred embodiment of the propellant cage according to the invention mentioned further above in which the base includes a hollow-cylindrical portion comprising the gas inlet opening, it may also be the case that no lateral gas flow opening is disposed in the hollow-cylindrical portion. Irrespective of whether a lateral gas flow opening is provided in the hollow-cylindrical portion, the hollow-cylindrical portion may merge into the funnel-shaped portion. The hollow-cylindrical portion is preferably adapted to be connected to an igniter unit or, resp., at least to be positioned relative to the igniter unit so that a fluid communication may form between an end face of the igniter unit to be opened and the interior of the hollow-cylindrical portion. The hollow-cylindrical shape ensures especially proper sealing against an igniter unit. Said sealing need not be gastight, but it should entail the advantage that hardly any igniting energy will be quasi lost by the sealing. Moreover, the hollow-cylindrical portion contributes to forming a shock wave which is stabilized in a subsequent funnel-shaped portion of the base.

The lateral gas flow opening and/or the hole pattern may extend into the hollow-cylindrical portion and/or the funnel-shaped portion. In this way, the flow cross-section of the lateral gas flow opening and, resp., of the plural lateral gas flow openings may be increased. This results in higher efficiency in igniting propellant bodies in a propellant chamber which surrounds the propellant cage.

Another preferred variant of the invention provides the base of the propellant cage to be formed integrally and the hollow-cylindrical portion to merge into the funnel-shaped portion. In particular, the hollow-cylindrical portion, the funnel-shaped portion and the collar are jointly integrally formed. The base may be made from metal so that it can resist the high temperatures of the ignition gas.

An independent aspect of the invention relates to an inflator, especially a tubular inflator, for an airbag module. The inflator includes a tubular housing and a propellant cage, wherein the propellant cage may be configured according to the foregoing description relating to the propellant cage according to the invention. The propellant cage is arranged inside the tubular housing and by the tubular housing delimits a propellant chamber including gas-generating propellant bodies. The propellant chamber may be especially hollow-cylindrical. The propellant bodies may be present of preference as compressed propellant pellets but also as extruded bodies and/or in the form of a monolithic molded body or in the form of axially stringed disks or rings.

The at least one lateral gas flow opening of the propellant cage may form a gas inlet of the propellant chamber and, resp., a gas inlet for the propellant chamber. Via the gas inlet and, resp., the at least one lateral gas flow opening thus ignition gas, which may also comprise ignition fume and/or hot ignition particles, may pass into the propellant chamber. The at least one frontal gas flow opening may further form a gas outlet of the propellant chamber. Propellant gas generated in the propellant chamber by burn-up of the propellant bodies can leave the propellant chamber via the gas outlet and, resp., the frontal gas flow opening.

Hence, via the gas inlet ignition gas or, resp., a portion of the whole ignition gas available can flow radially, but not necessarily perpendicularly, to the longitudinal axis of the propellant cage into the propellant chamber. The propellant gas generated in the propellant chamber may leave the propellant chamber through the gas outlet substantially in parallel to the longitudinal axis of the propellant cage. Preferably, the gas outlet is configured so that the propellant gas leaves the propellant chamber in the same flow direction in which ignition gas or a portion of ignition gas axially passes through the propellant cage. Accordingly, substantially the whole ignition gas available is quasi divided into ignition gas passing in the interior, viz. axially through the propellant cage, and the respective remaining portion(s) thereof which is/are radially discharged through the lateral gas flow opening(s) via the gas inlet into the propellant chamber for igniting the propellant bodies.

In a preferred embodiment of the inflator according to the invention, the collar of the propellant cage is provided to abut, especially sealingly, against a circumferential taper of the housing of the inflator. Concretely speaking, the housing of the inflator may have a taper, especially an inwardly facing taper which is preferably designed to be fully radially circumferential. The taper thus forms, at an inner periphery of the housing, an annular beading against which the collar of the propellant cage may abut. Especially the collar may sealingly abut in this case, wherein such abutment is not mandatory to be gastight, as it is already sufficient when particles such as propellant particles are prevented from passing between the collar of the propellant cage and the taper at the housing of the inflator. In this way, the propellant cage is fixed in the housing in the direction of the longitudinal axis.

Moreover, in the tubular housing an igniter unit may be arranged which is in fluid communication with the gas inlet opening of the propellant cage, wherein the igniter unit is especially inserted in the gas inlet opening and preferably includes an inlet-side bursting diaphragm for closing the gas inlet opening. The term "in fluid communication" in this case means that there is no obstacle in accordance with a blockade for fluids between the ignition unit, especially the inlet-side bursting diaphragm, and the gas inlet opening of the propellant cage. In other words, at least an area of the igniter unit, viz. the inlet-side bursting diaphragm to be opened in the case of activation of the inflator, is communicated with the gas inlet opening so that, in the case of activation, ignition gas may flow directly from or out of the igniter unit into the gas inlet opening and, resp., into an adjacent flow passage of the propellant cage. Hence, especially the igniter unit may be inserted in an axial end portion of the propellant cage. In so doing, preferably a substantially sealing connection is made between the igniter unit and the propellant cage so that ignition gas and, resp., hot ignition particles or ignition fume flowing out of the igniter unit flow exclusively into the propellant cage.

In other words, the inlet-side bursting diaphragm of the igniter unit separates an ignition chamber from a flow passage of the propellant cage, the flow passage being formed between the gas inlet opening and the gas outlet opening of the base of the propellant cage. The flow opening is delimited in the circumferential direction by the circumferential wall of the base.

In preferred embodiments, the propellant cage is provided to be arranged inside the inflator in a compressed gas area. Especially also the propellant chamber may be arranged in the compressed gas area. Compressed gas disposed inside the housing of the inflator thus may also surround the propellant bodies. In this respect, the inlet-side bursting diaphragm of the igniter unit separates the ignition chamber from a compressed gas chamber of the inflator. In the operative state of said inflator, pressure values of the compressed gas at room temperature ranging from 250 to 800 bars, especially of 550 bars, may occur, wherein the compressed gas may be one single gas or a mixture of plural gases such as argon, oxygen, nitrogen or helium.

As already indicated above, it is preferred that gas-generating propellant bodies are disposed in the propellant chamber. The gas-generating propellant bodies may be constituted especially by compressed propellant pellets or extruded propellant bodies loosely as a so-called propellant bed. After being ignited by ignition gas from the igniter unit, during burn-up the propellant bodies generate a propellant gas that causes or assists in the inflation of an airbag.

The housing of the inflator advantageously forms a compressed gas tank that is filled with biased compressed gas. After activation of the inflator, the compressed gas may be released, in addition to the propellant gas, and may be introduced to an airbag. In this way, the compressed gas assists in inflating the airbag.

Another independent aspect of the invention relates to an airbag module comprising an inflator, an airbag inflatable by the inflator and a securing means for mounting the airbag module to a vehicle. The inflator is preferably designed as described before.

Further, within the scope of the present application, a vehicle safety system, especially for protecting a person such as a vehicle occupant or a pedestrian, is disclosed and claimed. The vehicle safety system according to the invention comprises an inflator, an airbag inflatable by the latter as part of an airbag module and an electronic control unit by means of which the inflator can be activated in the event of a trigger situation. In the vehicle safety system according to the invention, the inflator is preferably designed according to the afore-described manner.

Another independent aspect of the invention relates to a method of operating an inflator, especially a pyrotechnic tubular inflator. The inflator may be designed especially according to the afore-described manner. The operating method according to the invention comprises the following steps of:
triggering an igniter unit for generating ignition gas inside an ignition chamber;
axially introducing the ignition gas to a flow passage tubularly encompassed by a propellant cage;
discharging part of the ignition gas via lateral gas flow openings of the propellant cage into a propellant chamber radially inwardly delimited by the propellant cage;
igniting propellant bodies, especially propellant pellets, in the propellant chamber by the discharged part of the ignition gas, with propellant gas being generated; and
passing the propellant gas out of the propellant chamber through frontal gas flow openings of the propellant cage.

Moreover, the invention relates to a method of guiding a shock wave inside an inflator, especially a pyrotechnic tubular inflator, the inflator being preferably designed according to the afore-described manner. The method of guiding a shock wave preferably comprises the following steps of:
triggering an igniter unit for generating excess pressure inside an ignition chamber;
generating a shock wave by bursting an inlet-side bursting diaphragm by means of excess pressure, the bursting diaphragm being disposed in the area of a gas inlet opening of a tubular base of a propellant cage;
guiding the shock wave along the base; and
radially widening the shock wave along a portion of the base widening in funnel shape.

BRIEF DESCRIPTION OF THE DRAWINGS

Hereinafter, the invention shall be illustrated in detail by way of example embodiments with reference to the enclosed schematic drawings, wherein:

FIG. 2a shows a lateral view of the propellant cage according to FIG. 1;

FIG. 2b shows a front view of the propellant cage according to FIG. 2a;

FIG. 3b shows a front view of the propellant cage according to FIG. 3a;

FIG. 5b shows a front view of the propellant cage according to FIG. 5a;

FIG. 5c shows a lateral view of the propellant cage according to FIG. 5a;

FIG. 6b shows a rear view of the propellant cage according to FIG. 6a; and

FIG. 6c shows a lateral view of the propellant cage according to FIG. 6a.

DESCRIPTION

Figure 1:
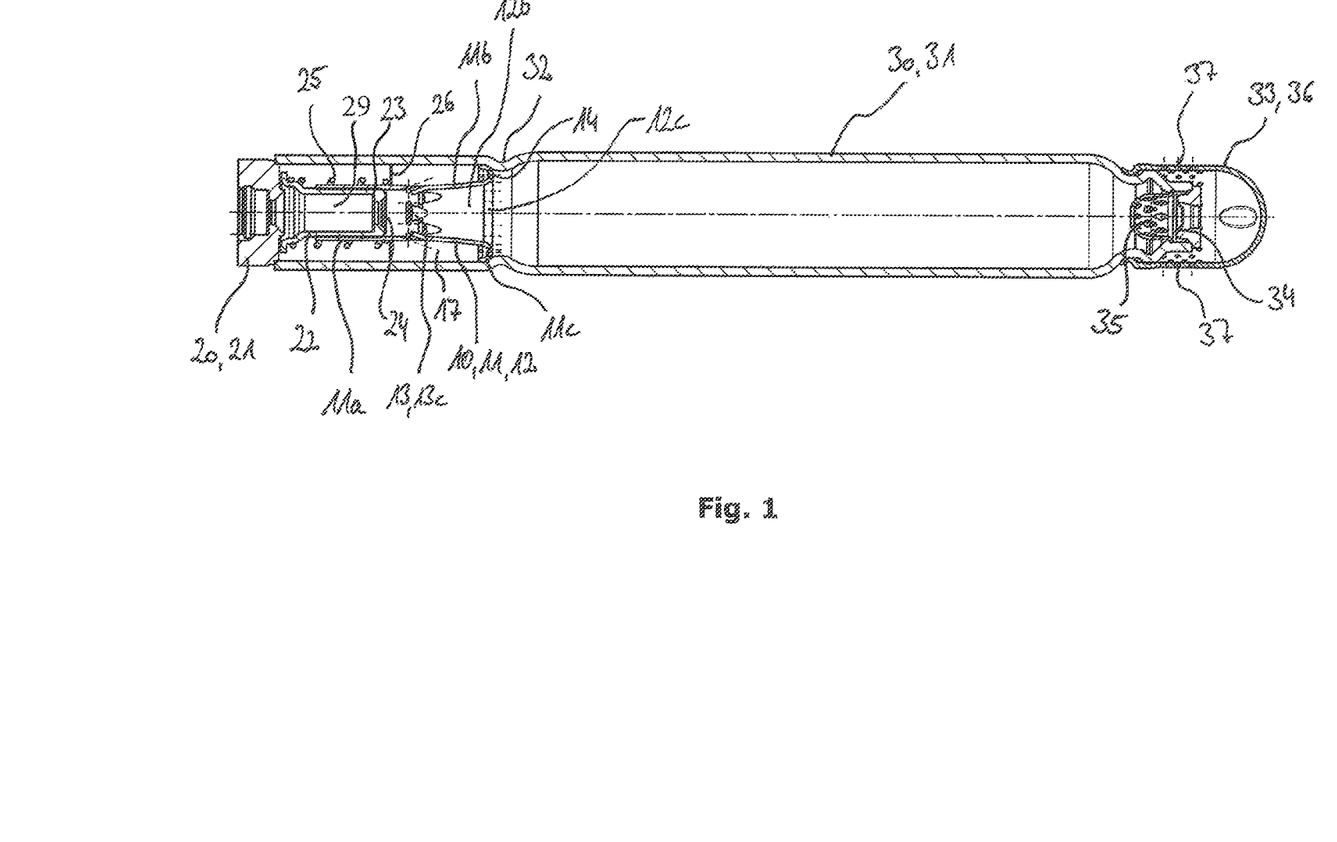
FIG. 1 shows a longitudinal section view across a tubular inflator comprising a propellant cage according to the invention.

FIG. 1 illustrates a longitudinal section across an inflator by which the mounting state of a propellant cage 10 according to the invention is to be shown. The inflator is in the form of a tubular inflator and comprises a compressed gas tank 30 forming a housing 31 of the inflator. The compressed gas tank 30 takes a substantially tubular shape. A taper 32 of the housing 31, which may be e.g. a crimping or rolling, divides the compressed gas tank 30 into a first portion in which an igniter unit 20 and the propellant cage 10 are disposed. A second portion of the compressed gas tank 30 is substantially free of built-in parts and substantially serves for receiving biased compressed gas. The compressed gas may be disposed in the compressed gas tank 30 e.g. at a pressure of 550 bars at room temperature.

At an outlet-side end of the compressed gas tank 30 and, resp., of the housing 31 an outlet-side bursting diaphragm 34 is disposed. The outlet-side bursting diaphragm 34 closes the compressed gas tank 30 in a gas-tight manner. A filter screen 35 is arranged upstream of the outlet-side bursting diaphragm 34 in the gas flow direction. The filter screen 35 filters burnt particles so that they will not enter into an airbag connected to the inflator.

At the outlet-side end of the compressed gas tank 30 furthermore a diffuser 33 is arranged. The diffuser 33 includes a diffuser cap 36 which is connected e.g. by crimping, rolling or welding to the housing 31 of the inflator. The diffuser cap 36 comprises outlet openings 37 which extend substantially radially outwardly. Via the outlet openings 37 released gas, such as propellant gas and/or biased compressed gas, may flow into a connected airbag after the outlet-side bursting diaphragm 34 has been opened.

At the inlet-side end of the compressed gas tank 30 and, resp., of the housing 31 an igniter unit 20 is arranged. Concretely speaking, the igniter unit 20 is inserted in the first portion of the compressed gas tank 30 which is separated from the second portion of the compressed gas tank 30 by the taper 32. The igniter unit 20 comprises an igniter carrier 21 made from metal and closing, as a type of locking piece, the inlet-side end of the compressed gas tank 30, as it is welded to the axial end of the compressed gas tank 30 in a radially circumferential way. Further, the igniter unit 20 includes an igniter 29 that is preferably formed as a pyrotechnically electric igniter and thus includes electric terminals and, resp., terminal contacts for connection to an electronic control unit. The electronic control unit is preferably provided in a vehicle in which the inflator is mounted and enables the inflator to be activated in a predetermined trigger situation. The igniter 29 further comprises an ignition element (not shown), preferably in the form of a bridge wire, to which igniter pyrotechnics is adjacent which can be activated and, resp., ignited in the event of the trigger situation by heating the ignition element and which can release hot ignition energy, ignition particles and/or ignition gases by opening the igniter. For the sake of clarity, FIG. 1 shows the igniter 29 only with its encompassing contour but not including its afore-mentioned inner components. The igniter 29 is inserted in the igniter carrier 21 and, resp., is positively and/or non-positively fastened there.

An igniter chamber cap 22 is attached to the igniter carrier 21 and is radially circumferentially welded to the igniter carrier in a pressure-tight manner especially by a flange-type configuration pointing to the igniter carrier 21. The igniter chamber cap 22 is to be understood as a constituent part of the igniter unit 20 in this case and delimits an ignition chamber 23 into which the igniter 29 protrudes.

At an end of the igniter chamber cap 22 opposed to the igniter carrier 21 an inlet-side bursting diaphragm 24 is provided. Here, on the one hand, the inlet-side bursting diaphragm 24 may be an integral part of the igniter chamber cap 22 by being e.g. integrally formed with the latter and being provided with a thinner material thickness than the remaining part of the igniter chamber cap 22 in the area over which it extends and/or by exhibiting predetermined breaking points or lines at which the bursting diaphragm 24 can be opened when an internal pressure is building up within the igniter chamber cap 22. On the other hand, the inlet-side bursting diaphragm 24 may be a separate component, where necessary also provided with predetermined breaking points, and may be adhesively fastened, especially by welding, to a frontal end of the igniter chamber cap 22, preferably to a central opening there. The inlet-side bursting diaphragm 24 separates the ignition chamber 23 from a gas-filled interior of the compressed gas tank 30. When activating the inflator and activating and, resp., igniting the igniter 29, in the ignition chamber 23 hot burnt gases and/or burnt particles are formed by burn-up of the igniter pyrotechnics and thus excess pressure is formed which finally results in opening, rupturing and/or bursting of the inlet-side bursting diaphragm 24. The ignition gas and, resp., ignition particles formed in the ignition chamber 23 can leave the ignition chamber 23 in the direction of the outlet-side bursting diaphragm 34.

The propellant cage 10 is shown to be attached to the igniter chamber cap 22 and, resp., during manufacture of the inflator the complete assembly of the igniter unit 20 with its igniter chamber cap 22 positioned ahead is inserted into the propellant cage 10 axially pre-positioned by the taper 32. The propellant cage 10 includes a tubular base 11 which has a slightly larger inside diameter value than the outer diameter value of the igniter chamber cap 22 to be inserted into the latter. The respective contact faces of the inserted igniter chamber cap 22 and of the tubular base 11 surrounding the latter are overlapping in the axial direction at least so far that ignition gases and, resp., ignition particles are prevented from escaping between the igniter chamber cap 22 and the tubular base 11 in the direction of the igniter carrier 21 after opening of the inlet-side bursting diaphragm 24. Especially, the base 11 comprises a hollow-cylindrical portion 11a which is directly attached to the igniter chamber cap 22. A funnel-shaped portion 11b is adjacent to the hollow-cylindrical portion 11a. The funnel-shaped portion 11b widens in the flow direction of the ignition gas, viz. in the direction of the outlet-side bursting diaphragm 34. Concretely speaking, the funnel-shaped portion 11b has a smaller cross-sectional diameter on a side facing the hollow-cylindrical portion 11a than in an area spaced apart from the hollow-cylindrical portion 11a. In other words, the diameter of the funnel-shaped portion 11b is continuously increasing with the distance from the gas inlet opening 12a of the propellant cage 10.

The funnel-shaped portion 11b further merges into a collar 11c extending substantially radially outwardly. Concretely, the collar 11c is provided to be turned inside-out and to extend radially outwardly at least in portions. The collar 11c may also be considered to be a flange-type frontal end of the propellant cage 10. The hollow-cylindrical portion 11a, the funnel-shaped portion 11b and the collar 11c substantially impart a trumpet shape to the base 11.

In the mounting state of the propellant cage 10 the collar 11c is adjacent to the taper 32 of the compressed gas tank 30 of the inflator and there can form a particular sealing against a passage of propellant particles or burnt products in the operating case. Thus, the propellant cage 10 is fixed in the direction of the longitudinal axis in the housing 31. Between the propellant cage 10, especially a circumferential wall 12 of the propellant cage 10 and the housing 31 of the inflator, an especially annular or hollow-cylindrical propellant chamber 17 is formed. The propellant chamber 17 is further delimited in the axial direction toward the igniter carrier 21 by a front disk 26 which is biased in the axial direction by means of a spring packing 25, wherein the front disk 26 may be tightly, especially adhesively, connected to or even formed integrally with the spring packing 25. The propellant chamber 17 is filled with propellant bodies, especially propellant pellets. Said propellant bodies are not shown in the propellant chamber 17 of FIG. 1 for reasons of clarity. Usually in the idle state of the inflator, i.e. before activation thereof, substantially the whole propellant chamber 17 is filled with said propellant bodies, viz. when viewed in the axial extension, from the collar 11c of the propellant cage 10 to the front disk 26. The front disk 26 may also have an axial position which is somewhat deviating from that shown in FIG. 1, viz. a position, when viewed in the direction of flow, directly ahead of the lateral flow openings 13 in the direction of the ignition support 21 up to close to the flange-type formation of the igniter chamber cap 22 which is fastened to the igniter carrier, wherein in the latter position of the front disk 26 an as large volume as possible for the propellant chamber 17 and thus a maximum filling amount for propellant bodies is facilitated. By means of the front disk 26 which is spring-biased by the spring packing 25, compacting of the propellant bodies in the propellant chamber 17 and/or the function of a volume balancing means when filling the propellant chamber 17 with propellant bodies is achieved during manufacture of the inflator.

The propellant chamber 17 includes a gas inlet and a gas outlet. It is concretely provided that ignition gas flows into the propellant chamber 17 via the gas inlet to ignite the propellant bodies present there. Propellant gas forming by the burn-up of the propellant bodies leaves the propellant chamber 17 via the gas outlet which is different from the gas inlet and is especially spaced apart therefrom.

The gas inlet and the gas outlet of the propellant chamber 17 are formed by appropriate gas flow openings in the propellant cage 10 in the inflator according to the invention. For this purpose, the propellant cage 10 includes at least one, preferably plural, lateral gas flow openings 13 in its circumferential wall 12. The lateral gas flow openings 13 form the gas inlet for the propellant chamber 17. Preferably, the lateral gas flow openings 13 are arranged at least in the funnel-shaped portion 11b of the base 11. The lateral gas flow openings 13 may additionally extend also into the hollow-cylindrical portion 11a, however. It is also possible that several of the plural lateral gas flow openings 13 are provided in the hollow-cylindrical portion 11a. The lateral gas flow openings 13 may have a different geometric design and may be differently positioned in the area of the base 11. Especially, plural lateral gas flow openings 13 may form different hole patterns. This will be explained in detail by way of some example embodiments further below.

It is applicable to all example embodiments, however, that the gas outlet of the propellant chamber 17 is formed by at least one, preferably plural, frontal gas flow openings 14 present in the propellant cage 10. The frontal gas flow openings 14 are arranged in the collar 11c of the base 11. It is especially provided that the frontal gas flow openings 14 cause gas flow out of the propellant chamber 17 substantially in parallel to the longitudinal axis of the compressed gas tank 30. The frontal gas flow openings 14 may equally have different geometries and positions. Plural frontal gas flow openings 14 may equally jointly form a hole pattern, with different hole patterns being realizable. The function of a gas outlet for the propellant chamber is achieved by all imaginable hole patterns.

By way of the example embodiment according to FIG. 1, the functioning thereof shall be explained in detail in the following. Upon activation of the inflator, first the igniter 29 is activated and thus ignited inside the ignition chamber 23, wherein ignition and burn-up products of the igniter pyrotechnics are formed. The resulting increase in pressure causes the inlet-side bursting diaphragm 24 to burst. This has two effects. On the one hand, the hot ignition gas is guided from the ignition chamber 23 into the interior of the propellant cage 10. On the other hand, the sudden pressure difference upon bursting of the inlet-side bursting diaphragm 24 causes a shock wave which moves and, resp., propagates in the direction of the longitudinal axis through the compressed gas tank 30. The forming shock wave can be triggered already upon activation of the igniter 29 and is intended, because the shock wave, upon impinging on the outlet-side bursting diaphragm 34, is to cause the outlet-side bursting diaphragm 34 to open and, resp., to burst so that a fluid communication with a connected airbag can be established. Concretely speaking, after opening the outlet-side bursting diaphragm 34 the compressed gas can flow from the compressed gas tank 30 via the diffuser 33 and the outlet openings 37 thereof into an airbag. Here it is possible that propellant gas from burn-up of the propellant bodies equally flows out of the outlet-side bursting diaphragm 34 simultaneously with the biased compressed gas.

In order to reliably ensure that the outlet-side bursting diaphragm 34 will burst, especially at a predetermined point in time, a stable shock wave which can be reliably generated along the entire respective extension of an inflator is useful. It has surprisingly turned out that the funnel-shaped portion 11b forming a flow passage 12b widening in the flow direction produces stabilization of the shock wave. The trumpet-shaped design of the propellant cage 10 thus ensures robust formation of the shock wave so that bursting of the outlet-side bursting diaphragm 34 can be safely guaranteed.

Apart from the formation of a shock wave, the rupture and, resp., opening of the inlet-side bursting diaphragm 24 causes hot ignition gas to flow into the interior of the propellant cage 10, especial into the flow passage 12b thereof. The ignition gas enters via the gas inlet opening 12a into the flow passage 12b and through the latter is guided to the gas outlet opening 12c. However, part of the hot ignition gas is guided into the propellant chamber 17 through the lateral gas flow openings 13 provided in the circumferential wall 12 of the propellant cage 10. The hot ignition gas ignites in the propellant chamber 17 the propellant bodies which during burn-up thereof release a propellant gas. The propellant gas now can leave the propellant chamber 17 via the frontal gas flow openings 14, especially simultaneously with the further flow of ignition gas into the propellant chamber 17. Since the propellant gas thus flows in the same direction of flow into the compressed gas tank 30 as the portion of the ignition gas which is guided in the direction of the longitudinal axis through the interior of the propellant cage 10, undesired turbulences of gas flows and/or corresponding energy losses are avoided. In this way, the efficiency of the release of the propellant gas is increased. Concretely speaking, losses which otherwise might occur due to flow turbulences are thus avoided.

The propellant gas flowing through the frontal gas flow openings 14 into the main area of the compressed gas tank 30 in its further flow and, resp., in the further course of the inflator function leaves the inflator via the diffuser 33 jointly with the compressed gas disposed in the compressed gas tank 30 and flows into the airbag.

Figures 2A, 2B:
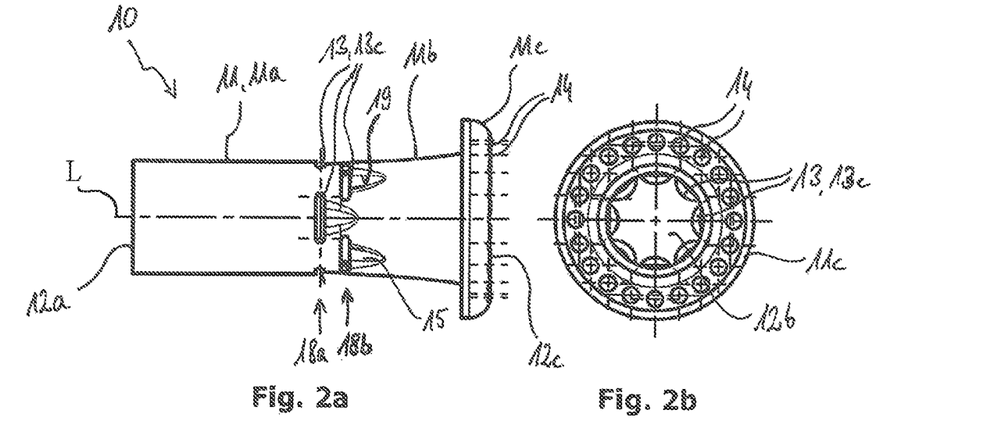

FIGS. 2a and 2b in detail show the propellant cage 10 which is inserted in the inflator according to FIG. 1. In this preferred example embodiment of the invention, plural lateral gas flow openings 13 are provided to be disposed in the funnel-shaped portion 11b of the base 11. The lateral gas flow openings 13 are gill-type or form gill-type gas flow openings 13c. The gill-type gas flow openings 13c are formed especially by shaping the circumferential wall 12, especially in the direction of the interior of the base 11. Concretely, the circumferential wall 12 is partially inwardly indented so that shaped parts 15 will form. The lateral gas flow openings 13 can be manufactured, for example, by initially producing appropriate cuts or slits extending through the complete wall thickness of the base 11, e.g. by material abrasion by milling or laser-working, and then an appropriate indentation is performed. It is equally possible, however, to carry out the afore-described two manufacturing steps in one single step by a suitable tool, especially having a sharp cutting portion adapted to realize the above-mentioned cuts and/or slits, pressing against the wall of the base so as to produce the gill-type gas flow openings 13c in one single step. The shaped parts 15 substantially form flow dividers which axially receive part of the ignition gas and guide it diagonally outwardly into the propellant chamber 17. Said flow deflection of part of the ignition gas is very low-loss manner which results in an especially efficient guiding of gas.

As is clearly shown in FIG. 2a, plural gill-type lateral gas flow openings 13, 13c may be arranged in circumferential direction of the base 11 at regular intervals. Moreover, further lateral gas flow openings 13 may be provided offset in the direction of the longitudinal axis. In other words, the lateral, especially gill-type, gas flow openings 13, 13c form a hole pattern in the example embodiment of FIGS. 2a and 2b, wherein two circumferential rows 18 of lateral gas flow openings 13 are formed. A first circumferential row 18a comprises plural lateral gas flow openings 13 regularly spaced in the circumferential direction. A second circumferential row 18b offset in the direction of the longitudinal axis of the propellant cage 10 and radially with respect to the first circumferential row 18a comprises the same number of lateral gas flow openings 13. Preferably, each of the two circumferential rows 18a, 18b comprises four lateral gas flow openings 13 in the form of gill-type gas flow openings 13c. The lateral gas flow openings 13 of the first circumferential row 18a are arranged to be offset and, resp., rotated against the lateral gas flow openings 13 of the second circumferential row 18b in the circumferential direction so that so-to-speak a peripheral pattern of lateral gas flow openings 13 is formed. This is clearly visible in the front view according to FIG. 2b.

As is clearly illustrated in FIG. 2a, at least the first circumferential row 18a of the lateral gas flow openings 13 is arranged directly at an end of the funnel-shaped portion 11b facing the hollow-cylindrical portion 11a. Especially, the first circumferential row 18a is arranged in the transition area between the hollow-cylindrical portion 11a and the funnel-shaped 11b. The second circumferential row 18b is arranged axially downstream in the flow direction, relating to the mounted state of the propellant cage 10, as shown in FIG. 1, offset against the first circumferential row 18a. The gill-type gas flow openings 13c are especially configured so that an ignition gas may flow axially into the gill-type gas flow openings 13 and is guided along a gas guiding surface 19 outwardly, especially into a propellant chamber 17. The gas guiding surface 19 has a flat angle with the longitudinal axis of the propellant cage 10 so that especially in the flow direction of the ignition gas little deflection of flow is produced. In other words, the gill-type gas flow openings 13c are opened toward the igniter unit 20 (mounting state according to FIG. 1) so that the ignition gas may flow into the gill-type gas flow openings 13c in the direction of flow.

FIG. 2b, on the one hand, shows the gill-type gas flow openings 13 in the funnel-shaped portion 11b which protrude into the flow passage 12b. Therefrom it is obvious that ignition gas passing the flow passage 12b is divided by means of the shaped parts 15 of the circumferential wall 12 which form the lateral gas flow openings 13. In this way, the flow is divided, wherein part of the ignition gas flow passes the interior of the propellant cage 10 in the direction of the longitudinal axis. Another part is discharged into the propellant chamber 17 via the lateral gas flow openings 13, on the other hand.

Further, it is clearly visible in FIG. 2b that the collar 11c includes a plurality of frontal gas flow openings 14. The frontal gas flow openings 14 are in the form of circular gas flow openings 14 in the shown example embodiment. Concretely, in the shown example embodiment twenty circular gas flow openings 14 are provided in the collar 11c. Said frontal gas flow openings 14 are arranged to be regularly spaced from each other and are positioned on a joint circle.

In general, it is outlined that the frontal gas flow openings 14 basically may equally be gill-type, slotted or circular, as shown in FIG. 2b. To simplify matters, in the further example embodiments of propellant cages 10 according to FIGS. 3a to 5c, the representation of the frontal gas flow openings 14 is dispensed with. However, it is applicable to all embodiments that frontal gas flow openings 14 are disposed in the collar 11c.

Figure 3A:
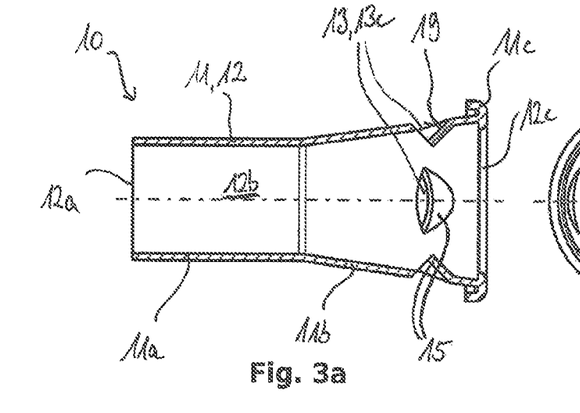
FIG. 3a shows a longitudinal section view of a propellant cage according to the invention as set forth in another preferred example embodiment.
Figure 3B:
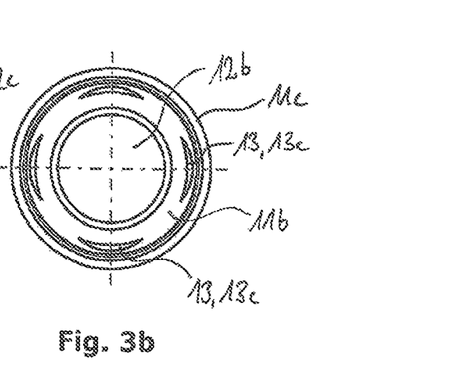

In FIGS. 3a and 3b, another example embodiment of a propellant cage 10 according to the invention is shown. The base 11 of the propellant cage 10 according to FIG. 3a, 3b is substantially identical to the base 11 of the propellant cage according to FIG. 2a, 2b. The propellant cage according to FIG. 3a, 3b differs therefrom by the arrangement of the gill-type lateral gas flow openings 13. In the example embodiment according to FIG. 3a, 3b, the lateral gas flow openings 13 are arranged to be spaced apart from the hollow-cylindrical portion 11a and, resp., to be spaced apart farther than in FIG. 2a, 2b. Concretely, the lateral gas flow openings 13 are arranged more closely to the gas flow opening 12c of the base 11 than compared to the hollow-cylindrical portion 11a. Concretely speaking, four lateral gas flow openings 13 in the form of gill-type gas flow openings 13c are arranged to be distributed at regular intervals along the periphery of the funnel-shaped portion 11b. FIG. 3a clearly shows that the gill-type gas flow openings 13c are formed radially inwardly by a partial shaping of the circumferential wall 12. The shaped parts 15 form flow dividers having a gas guiding surface 19 which guide flow gas or gas that flows against the gas guiding surface 19 inside the propellant cage 10 diagonally outwardly into a propellant chamber 17 (in the mounting state according to FIG. 1). A different number of lateral gas flow openings 13 is possible, as a matter of course.

In FIGS. 4a to 4h different hole patterns for the lateral gas flow openings 13 of the propellant cage 10 are shown. The illustrated example embodiments constitute merely a selection of options as to how hole patterns for propellant cages 10 according to the invention may be designed. Substantially all example embodiments according to FIGS. 4a to 4h include identical bases 11. Concretely, the base 11 of each of the shown propellant cages 10 includes a hollow-cylindrical portion 11a, a funnel-shaped portion 11b and a collar 11c. The base 11 is integrally formed, with the funnel-shaped portion 11b extending between the hollow-cylindrical portion 11a and the collar 11c. Concretely speaking, the funnel-shaped portion 11b connects the hollow-cylindrical portion 11a to the collar 11c.

The collar 11c is turned inside-out, with the circumferential wall 12a being substantially returned radially outwardly and coaxially in the further extension.

Figure 4A:
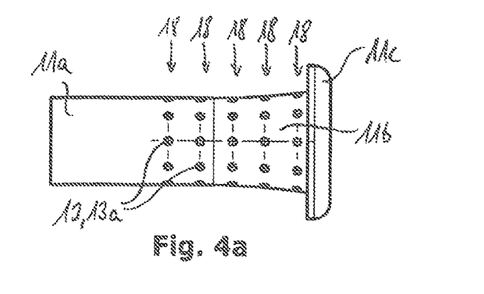
FIGS. 4a to 4h show lateral views of a propellant cage according to the invention as set forth in a preferred example embodiment, wherein different hole patterns of the lateral gas flow openings are illustrated.

FIG. 4a illustrates a hole pattern, with the lateral gas flow openings 13 being configured as circular gas flow openings 13a. Plural circumferential rows 18 of circular gas flow openings 13a are provided. Concretely speaking, the example embodiment according to FIG. 4a shows five circumferential rows each including eight lateral gas flow openings 13. Both the circumferential rows 18 and the lateral gas flow openings 13 within each circumferential row 18 are arranged to be regularly spaced apart from each other. Two circumferential rows 18 out of the five circumferential rows 18 are arranged in the hollow-cylindrical portion 11a and three circumferential rows 18 are arranged in the funnel-shaped portion 11b.

Figure 4B:
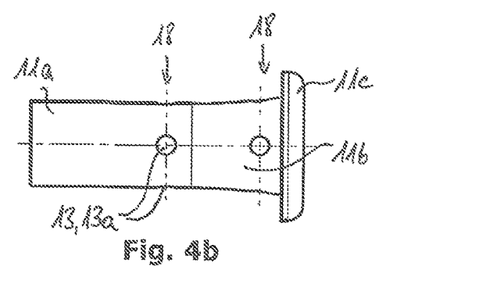

FIG. 4b shows a hole pattern having two circumferential rows 18, each circumferential row 18 including four lateral gas flow openings 13 which are in the form of circular gas flow openings 13a. The lateral gas flow openings 13 are arranged at regular intervals along the respective circumferential row 18. One of the circumferential rows 18 is arranged in the hollow-cylindrical portion 11a, whereas the further circumferential row 18 is arranged in the funnel-shaped portion 11b.

Figure 4C:
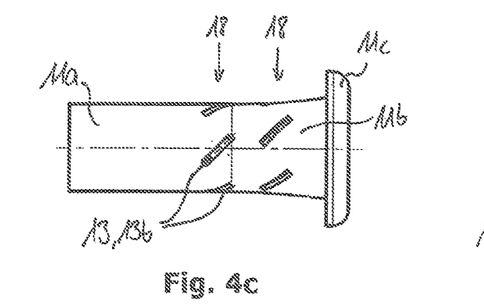

FIG. 4c shows a hole pattern in which the lateral gas flow openings 13 are slotted gas flow openings 13b. Concretely, two circumferential rows 18 of lateral gas flow openings 13 forming respective slotted gas flow openings 13b are provided. The slotted gas flow openings 13b extend diagonally with respect to the longitudinal axis of the propellant cage 10. The slotted gas flow openings 13b substantially have a rectangular geometry. Each of the two circumferential rows 18 comprises four slotted gas flow openings 13b. The lateral gas flow openings 13 of adjacent circumferential rows 18 are arranged to be offset and, resp., rotated against each other in the circumferential direction. In the example embodiment according to FIG. 4c, one circumferential row 18 is arranged in the area of the hollow-cylindrical portion 11a, whereas another circumferential row 18 is arranged in the funnel-shaped portion 11b.

Figure 4D:
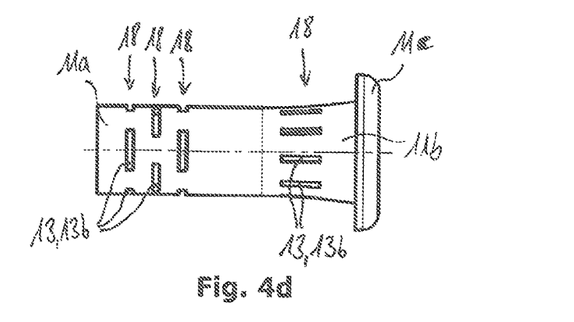

FIG. 4d equally illustrates a hole pattern having lateral gas flow openings 13 which are in the form of slotted gas flow openings 13b. In total, four circumferential rows 18 of lateral gas flow openings 13 are provided, wherein three circumferential rows 18 are provided in the area of the hollow-cylindrical portion 11a and one circumferential row 18 is provided in the area of the funnel-shaped portion 11b. In the example embodiment according to FIG. 4d, the lateral gas flow openings 13 arranged in the hollow-cylindrical portion 11a are different by their alignment from the lateral gas flow openings 13 arranged in the funnel-shaped portion 11b. In the funnel-shaped portion 11b the lateral gas flow openings 13 which are in the form of slotted gas flow openings 13b are oriented substantially in parallel to the longitudinal axis of the propellant cage 10. The circumferential row 18 of lateral gas flow openings 13 in the funnel-shaped portion 11b comprises from eight to ten, especially nine, slotted gas flow openings 13b. The lateral gas flow openings 13 in the hollow-cylindrical portion 11a are oriented to be slotted in the circumferential direction of the base 11, however. In other words, the slotted gas flow openings 13b extend in the hollow-cylindrical portion 11a at right angles with the slotted gas flow openings 13b in the funnel-shaped portion 11b. Each of the three circumferential rows 18 of slotted gas flow openings 13b in the hollow-cylindrical portion 11a comprises four lateral gas flow openings 13. The lateral gas flow openings 13 of adjacent circumferential rows 18 in the hollow-cylindrical portion 11a are oriented to be offset or, resp., rotated against each other in the circumferential direction.

Figure 4E:
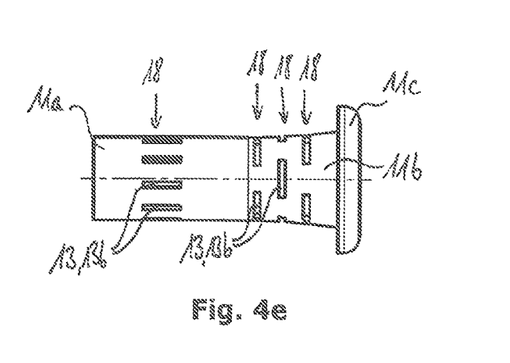

FIG. 4e shows a hole pattern which is formed substantially inversely to the hole pattern according to FIG. 4d. Concretely, again four circumferential rows 18 of lateral gas flow openings 13 are provided, wherein a circumferential row 18 of slotted gas flow openings 13b extending substantially in parallel to the longitudinal axis of the propellant cage 10 is formed in the hollow-cylindrical portion 11a. In the area of the funnel-shaped portion 11b, on the other hand, three circumferential rows 18 of lateral gas flow openings 13 are provided which form slotted gas flow openings 13b and are oriented at right angles with the gas flow openings 13 in the hollow-cylindrical portion 11a. Each of the three circumferential rows 18 comprises four lateral gas flow openings 13, with lateral gas flow openings 13 of directly adjacent circumferential rows 18 being arranged offset or, resp., rotated against each other in the circumferential direction of the base 11. The only circumferential row 18 of lateral gas flow openings 13 in the hollow-cylindrical portion 11a comprises from eight to ten, preferably nine, slotted gas flow openings 13b.

Figure 4F:
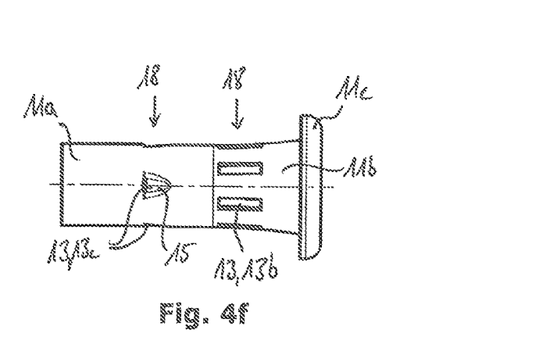

In the example embodiment according to FIG. 4f of a propellant cage 10 according to the invention, two circumferential rows 18 of lateral gas flow openings 13 are provided. One circumferential row 18 extends around the hollow-cylindrical portion 11a and comprises gill-type gas flow openings 13c. Another circumferential row 18 is arranged in the funnel-shaped portion 11b and comprises slotted gas flow openings 13b extending substantially in parallel to the longitudinal axis of the propellant cage 10. In the funnel-shaped portion 11b concretely six slotted gas flow openings 13b are provided. In the hollow-cylindrical portion 11a four gill-type gas flow openings 13 are provided at regular intervals in the circumferential direction in the example embodiment according to FIG. 4f.

Figure 4G:
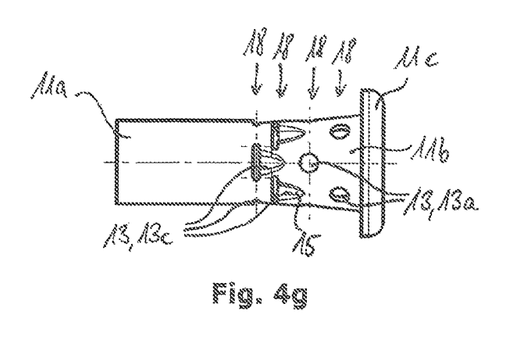

The example embodiment according to FIG. 4g is substantially based on the example embodiment according to FIG. 2a. The propellant cage 10 in the embodiment according to FIG. 4g has a base 11 which is formed analogously to the base 11 of the example embodiment according to FIG. 2a. Moreover, the gill-type gas flow openings 13c of the example embodiment according to FIG. 2a are identically adopted in the embodiment according to FIG. 4g so that in this respect reference is made to the example embodiment according to FIG. 2a. In addition, in the example embodiment according to FIG. 4g it is provided, however, to dispose further lateral gas flow openings 13 in the funnel-shaped portion 11b, wherein the further lateral gas flow openings 13 are in the form of circular gas flow openings 13a. Especially, two further circumferential rows 18 are provided in the funnel-shaped portion 11b each having plural circular gas flow openings 13a evenly spaced apart from each other in the circumferential direction. Especially each of the further circumferential rows 18 includes four circular gas flow openings 13a. Accordingly, the circular gas flow openings 13a of the two circumferential rows 18 are arranged to be offset or, resp., rotated against each other in the circumferential direction.

Figure 4H:
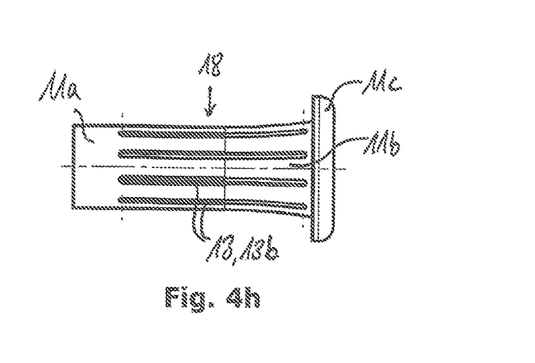

FIG. 4h shows an example embodiment of a propellant cage 10 according to the invention in which one single circumferential row 18 of lateral gas flow openings 13 is provided. The lateral gas flow openings 13 in this example embodiment are configured as slotted gas flow openings 13b extending substantially in parallel to the longitudinal axis of the propellant cage 10. The slotted gas flow openings 13b extend both through the funnel-shaped portion 11 and through the hollow-cylindrical portion 11a. In other words, the lateral gas flow openings 13 extend from the hollow-cylindrical portion 11a into the funnel-shaped portion 11b. In total, in the example embodiment according to FIG. 4h, eight slotted gas flow openings 13b are provided which are arranged at regular intervals in the circumferential direction. Each of the slotted gas flow openings 13b has the same length. It is also imaginable, however, that the lateral gas flow openings 13, especially in the form of slotted gas flow openings 13b, have different sizes and especially different lengths. The latter is applicable to all example embodiments.

Figure 5A:
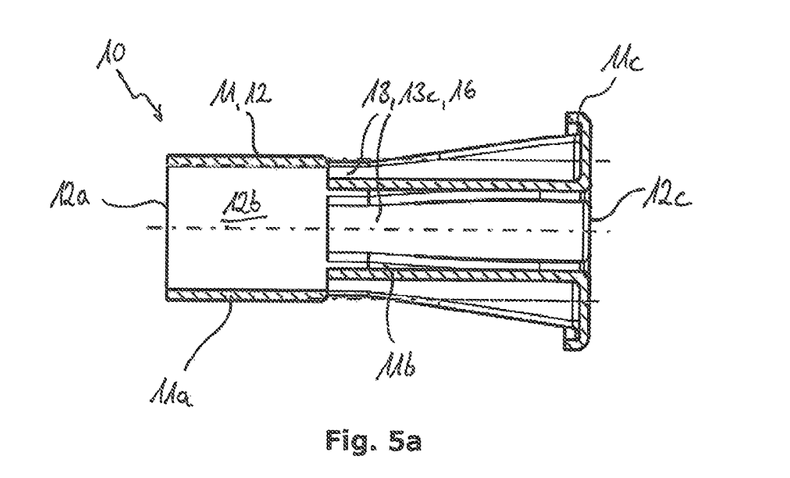
FIG. 5a shows a longitudinal section view across a propellant cage according to the invention as set forth in another preferred example embodiment, wherein the lateral gas flow openings form bypass channels open to the outside.
Figure 5B:
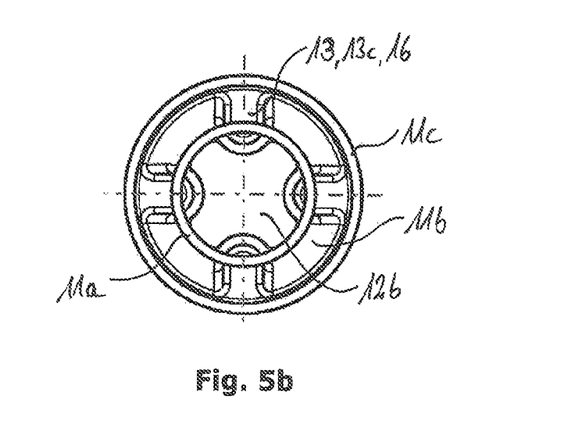
Figure 5C:
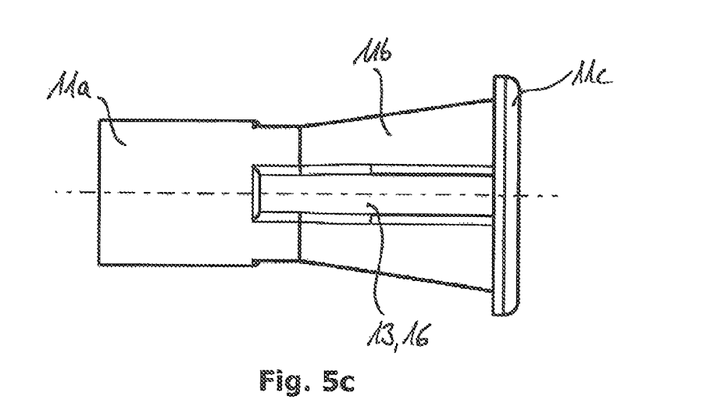

Another example embodiment of a propellant cage according to the invention is illustrated in FIGS. 5a to 5c. The basic structure of the propellant cage corresponds to the foregoing example embodiments. Concretely, the propellant cage has a base 11 comprising a hollow-cylindrical portion 11a, a funnel-shaped portion 11b and a collar 11c. The funnel-shaped portion 11b includes lateral gas flow openings 13. The special feature in the example embodiment according to FIG. 5c consists in the fact that the lateral gas flow openings 13 substantially are configured as radially outwardly open bypass channels 16. As is evident from FIG. 5b, a total of four bypass channels 16 arranged at regular intervals in the circumferential direction are provided. In particular, the bypass channels 16 are arranged at a 12 o'clock position, at a 3 o'clock position, at a 6 o'clock position and at a 9 o'clock position of the funnel-shaped portion 11b. Substantially the bypass channels 16 form a radially inwardly lowered groove in the funnel-shaped portion 11b, the groove being opened toward the hollow-cylindrical portion 11a (FIG. 5a, 5c). The frontal gas flow openings 14 in the collar 11c, which are not shown for reasons of clarity, are preferably arranged in the areas of the collar between the bypass channels 16. Alternatively, it is also possible to align the frontal gas flow openings 14 substantially with the bypass channels 16 in the collar 11c. In this way, the ignition gas arriving in the bypass channels 16 can be guided completely in parallel to the ignition gas which flows through the flow passage 12b and can effectuate ignition of the propellant bodies in the propellant chamber 17 (mounting situation of the propellant cage 10 according to FIG. 1). Since the bypass channels 16 are radially outwardly open, there is a fluid communication with the propellant chamber 17.

Figure 6A:
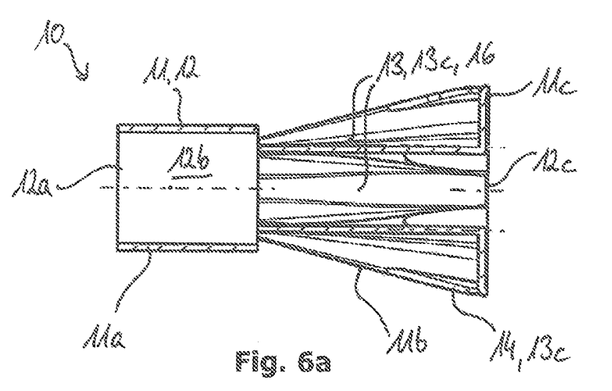
FIG. 6a shows a longitudinal section view across a propellant cage according to another preferred example embodiment, wherein the lateral gas flow openings form bypass channels tapering in the direction of the longitudinal axis.
Figure 6B:
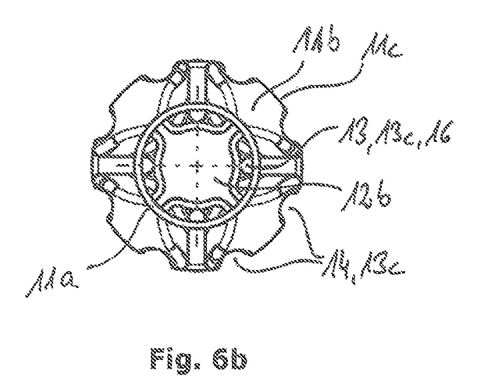
Figure 6C:
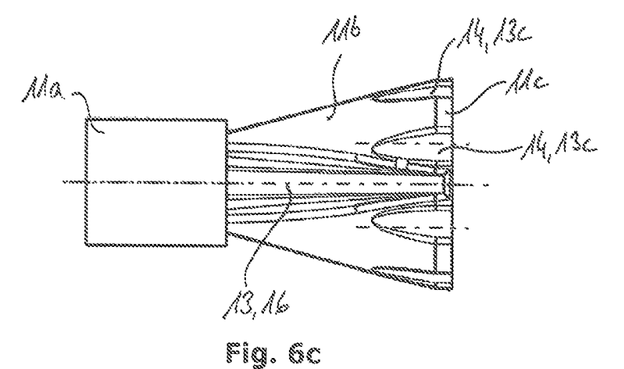

A similar example embodiment with lateral gas flow openings 13 in the form of bypass channels 16 is shown in FIGS. 6a to 6c. In this embodiment, the bypass channels 16 are groove-shaped, with the groove or, resp., the bypass channel 16 tapering from the hollow-cylindrical portion 11a toward the collar 11c. On the whole, four bypass channels 16 evenly spaced apart from each other in the circumferential direction are provided. The bypass channels 16 are arranged at a 12 o'clock position, at a 3 o'clock position, at a 6 o'clock position and at a 9 o'clock position (FIG. 6b). The collar 11c includes frontal gas flow openings 14 in the circumferential direction between the bypass channels 16. Concretely, the collar 11c forms frontal gas flow openings 14 which are substantially in the form of gill-type or groove-type gas flow openings 13c. The gas flow openings 13c in the collar 11c are concretely designed as concavities at the outer circumference of the collar 11c. Due to the trumpet-shaped design of the base 11, the concavities also extend into the funnel-shaped portion 11b, but are deemed to be frontal gas flow openings 14 of the collar 11c in accordance with the present application. In total, in the example embodiment according to FIGS. 6a to 6c, eight frontal gas flow openings 14 are provided which are arranged at regular intervals in the circumferential direction of the base 11.

When comparing the different example embodiments for propellant cages 10 according to the invention, it has turned out that especially those example embodiments in which the lateral gas flow openings 13 are configured as gill-type gas flow openings 13c in the funnel-shaped portion 11b produce particularly advantageous effects in triggering inflators. Concretely speaking, those lateral gas flow openings 13 which are formed by a shaped part 15 of the circumferential wall 12 are advantageous over e.g. purely circular gas flow openings 13a. It has surprisingly turned out that by forming the shaped parts 15 of the propellant cage 10, as in the case of said gill-type lateral gas flow openings 13c, an optimum flow guiding element is created. The gill-type gas flow openings 13c substantially work according to the principle of fixed blades which receive part of the ignition gas and discharge it into the propellant chamber 17.

LIST OF REFERENCE NUMERALS 10 propellant cage
11 base 11a hollow-cylindrical portion
11b funnel-shaped portion
11c collar
12 circumferential wall
12a gas inlet opening
12b flow passage
12c gas outlet opening
13 lateral gas flow opening
13a circular gas flow opening
13b slotted gas flow opening
13c gill-type gas flow opening
14 frontal gas flow opening
15 shaped part
16 bypass channel
17 propellant chamber
18 circumferential row
18a first circumferential row
18b second circumferential row
19 gas guiding surface
20 igniter unit
21 igniter carrier
22 igniter chamber cap
23 ignition chamber
24 inlet-side bursting diaphragm
25 spring packing
26 front disk
27 concavity
29 igniter
30 compressed gas tank
31 housing
32 taper
33 diffuser
34 outlet-side bursting diaphragm
35 filter screen
36 diffuser cap
37 outlet openings
L longitudinal axis

The invention claimed is:

1. A propellant cage (10) for an inflator of an airbag module, comprising a substantially tubular base (11) which along its longitudinal axis (L) forms a gas inlet opening (12a) and a gas outlet opening (12c), the base (11) defining a passageway that longitudinally extends through the propellant cage (10) from the gas inlet opening (12a) to the gas outlet opening (12c), at least one lateral gas flow opening (13) being formed in a circumferential wall (12) of the base (11), wherein the base (11) includes a radially outwardly extending collar (11c) which has at least one frontal gas flow opening (14) in the area of the gas outlet opening (12c).

2. The propellant cage (10) according to claim 1, wherein the base (11) includes a substantially funnel-shaped portion (11b) widening toward the gas outlet opening (12c), and wherein the at least one lateral gas flow opening (13) is arranged in the funnel-shaped portion (11b) or is disposed in a hollow-cylindrical portion (11a) of the base (11) comprising the gas inlet opening (12a).

3. The propellant cage (10) according to claim 1, wherein at least one of the at least one lateral gas flow opening (13) and the at least one frontal gas flow opening (14) is designed to be at least one of circular, slotted, and gill-type.

4. The propellant cage (10) according to claim 3, wherein the at least one lateral gas flow opening (13) is formed by a radially inwardly shaped part (15) of the circumferential wall (12) of the base (11).

5. The propellant cage (10) according to claim 4, wherein the shaped part (15) of the circumferential wall (12) forms a flow guiding element by which part of an axial ignition gas flow can be deflected to the outside.

6. The propellant cage (10) according to claim 2, wherein at least one of the circumferential wall (12), the funnel-shaped portion (11b), and the hollow-cylindrical portion (11a) comprises plural lateral gas flow openings (13) which jointly form a hole pattern.

7. The propellant cage (10) according to claim 6, wherein the lateral gas flow openings (13) of the hole pattern are configured to be geometrically different, wherein the lateral gas flow openings (13) are arranged to be regularly or irregularly distributed in the circumferential direction and/or in the longitudinal direction of the base (11).

8. The propellant cage (10) according to claim 2, wherein the base (11) is integrally formed and the hollow-cylindrical portion (11a) merges into the funnel-shaped portion (11b), wherein the lateral gas flow openings (13) and/or the hole pattern extend(s) into the hollow-cylindrical portion (11a) and/or into the funnel-shaped portion (11b).

9. An inflator for an airbag module comprising a tubular housing (31) and a propellant cage (10) according to claim 1, wherein the propellant cage (10) is arranged inside the tubular housing (31), and wherein the tubular housing (31) delimits a propellant chamber (17) which includes gas-generating propellant bodies.

10. The inflator according to claim 9, wherein the at least one lateral gas flow opening (13) forms a gas inlet of the propellant chamber (17) and the at least one frontal gas flow opening (14) forms a gas outlet of the propellant chamber (17).

11. The inflator according to claim 9, wherein an igniter unit (20) is arranged in the tubular housing (42), the igniter unit (20) being in fluid communication with the gas inlet opening (12a) of the propellant cage (10), wherein the igniter unit (20) is inserted into the gas inlet opening (12a) and includes an inlet-side bursting diaphragm (24) that closes the gas inlet opening (12a).

12. The inflator according to claim 9, wherein the housing (31) forms a compressed gas tank (30) which is filled with biased compressed gas, with the collar (11c) of the propellant cage (10) being adjacent to a circumferential taper (32) of the housing (31).

13. An airbag module comprising an inflator, an airbag inflatable by the inflator and a securing unit for attaching the airbag module to a vehicle, wherein the inflator is configured according to claim 9.

14. A vehicle safety system comprising the inflator of claim 9, an airbag inflatable by inflator as part of an airbag module, and an electronic control unit for activating the inflator when a trigger situation is given.

15. A method of operating an inflator according to claim 9, comprising the following steps of:
triggering an igniter unit (20) for generating ignition gas inside an ignition chamber (23);
axially introducing the ignition gas into a flow passage (12b) tubularly encompassed by a propellant cage (10);
discharging part of the ignition gas via lateral gas flow openings (13) of the propellant cage (10) into a propellant chamber (17) radially inwardly delimited by the propellant cage (10);
igniting propellant bodies, especially propellant pellets, within the propellant chamber (14) by the discharged part of the ignition gas, wherein propellant gas is generated; and
passing the propellant gas out of the propellant chamber (17) through frontal gas flow openings (14) of the propellant cage (10).

16. A method of guiding a shock wave within an inflator claim 9, comprising the following steps of:

triggering an igniter unit (20) for generating excess pressure inside an ignition chamber (23);

generating a shock wave by bursting an inlet-side bursting diaphragm (24) by means of the excess pressure, the bursting diaphragm being disposed in the area of a gas inlet opening (12a) of a tubular base (11) of a propellant cage (10);

guiding the shock wave along the base (11); and radially widening the shock wave along a funnel-shaped widening portion (11b) of the base (11).

17. The propellant cage (10) according to claim 6, wherein the lateral gas flow openings (13) of the hole pattern are configured to be at least one of circular, slotted, and gill-type, and wherein the lateral gas flow openings (13) are arranged to be regularly or irregularly distributed in the circumferential direction and/or in the longitudinal direction of the base (11).

18. The propellant cage (10) according to claim 1, wherein the propellant cage (10) is formed as a single piece.

\* \* \* \* \*